UNITED STATES PATENT OFFICE.

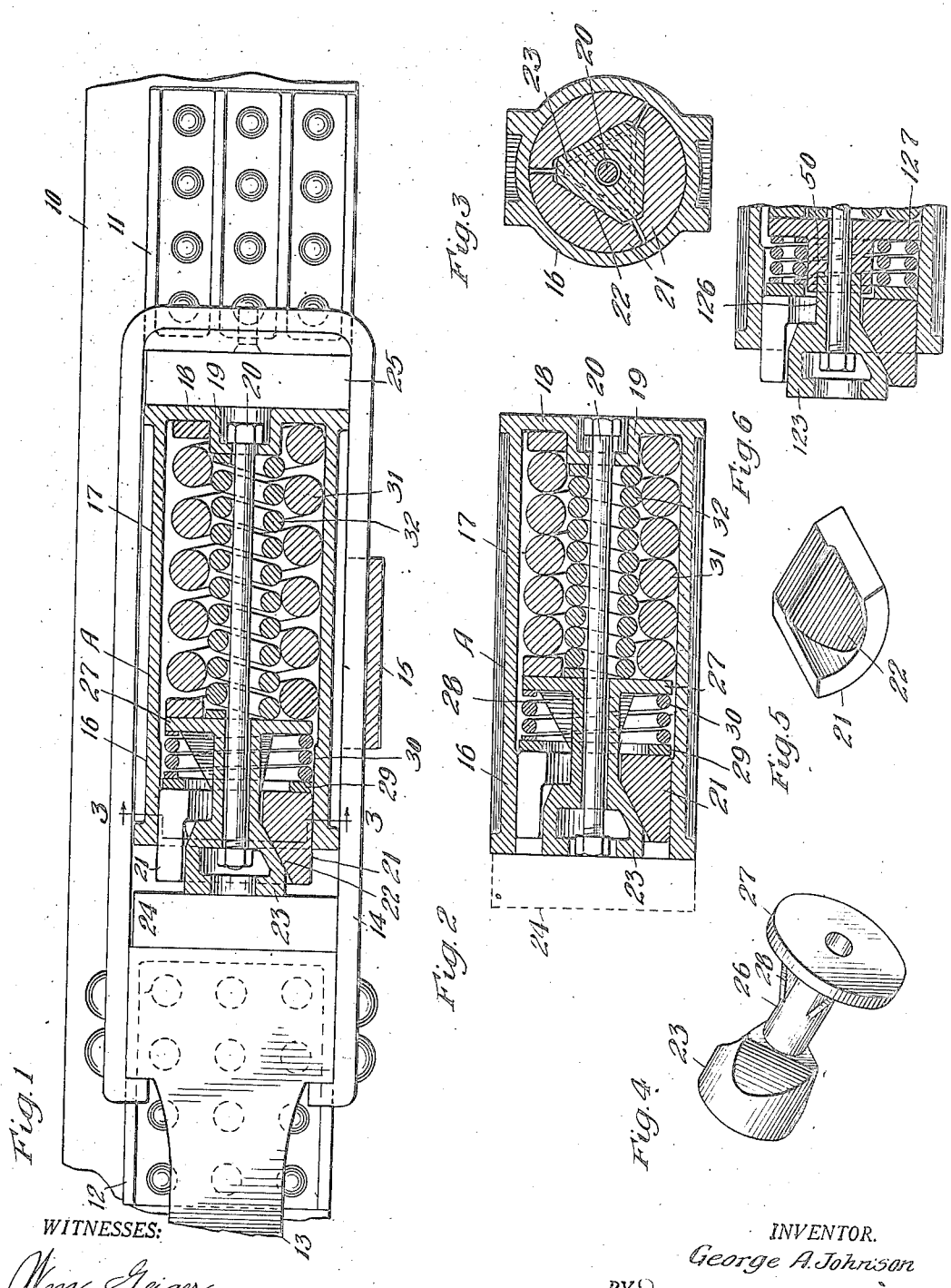

GEORGE A. JOHNSON, OF CHICAGO, ILLINOIS, ASSIGNOR TO WILLIAM H. MINER, OF CHAZY, NEW YORK.

RAILWAY-DRAFT-RIGGING FRICTION-GEAR.

1,301,946.

Specification of Letters Patent.

Patented Apr. 29, 1919.

Application filed January 2, 1917. Serial No. 140,012.

*To all whom it may concern:*

Be it known that I, GEORGE A. JOHNSON, a citizen of the United States, residing at Chicago, in the county of Cook and State of Illinois, have invented a certain new and useful Improvement in Railway-Draft-Rigging Friction-Gears, of which the following is a full, clear, concise, and exact description, reference being had to the accompanying drawings, forming a part of this specification.

This invention relates to improvements in railway draft rigging friction gears.

The object of the invention is to provide a friction gear suitable for railway draft riggings and wherein a substantially uniform or constant frictional resistance for absorbing the shocks is provided during the entire stroke of the gear.

In the drawing forming a part of this specification, Figure 1 is a part elevation, part longitudinal section of a draft rigging showing my improvements in connection therewith, the parts being illustrated in normal or full release position. Fig. 2 is a view similar to Fig. 1 of the gear proper and illustrating the position of the parts under full compression. Fig. 3 is a vertical, transverse sectional view of the friction gear and taken on the line 3—3 of Fig. 1. Figs. 4 and 5 are detail perspectives of the wedge and one of the friction shoes, respectively. And Fig. 6 is a broken view in section similar to Fig. 1, but illustrating another embodiment of the invention.

Referring first to the construction illustrated in Figs. 1 to 5 inclusive, 10 denotes a center sill having rear stop 11 and front stop 12 secured thereto. The draw bar 13 is operatively connected with the gear by means of a yoke 14 and the parts supported by a saddle plate 15. All of the foregoing structure may be of standard or well known construction.

The improved friction gear, as shown, comprises a preferably cylindrical casting A having an integral friction shell proper 16, spring casing 17, and rear wall 18, the latter having an inwardly extended hollow boss 19 to accommodate the rear end of the retaining bolt 20. Coöperable with the friction shell 16 is a circularly arranged series of friction shoes 21, each of the latter having a wedge face 22 on its interior with which coöperates a wedge 23. As clearly shown in Fig. 1, the friction shoes are extended outwardly beyond the end of the friction shell and the wedge in turn is extended beyond the ends of the friction shoes, the wedge engaging the front follower 24. The rear end of the casting A engages the rear follower 25. The wedge 23, which is provided with the same number of wedge faces as the number of friction shoes, has a hollow rearward extension 26, the latter at its rear end being provided with a wide flange 27, said flange being suitably reinforced by webs 28—28. The retaining bolt 20 extends through said hollow extension and the nut on the bolt is received within the hollow wedge 23. The friction shoes 21 bear at their rear ends against a washer 29 and between said washer 29 and flange 27 is located a light spring 30 which is, normally, almost fully compressed. Said spring 30, it will be noted, reacts against the wedge and the friction shoes in such a manner that the shoes are forced lengthwise against the wedge with a constant or predetermined force. Consequently, it will be seen that, by varying the strength of said spring 30 to any desired amount, a predetermined friction can be obtained between the friction shoes and the friction shell, which friction will remain substantially constant during the entire action of the gear. The wedge, shoes and spring 30 will operate as a unit which may be termed a friction piston in its relation with the friction shell. It will furthermore be noted that this friction is obtained at the very beginning of the compression stroke and is always maintained in normal position of the parts and during the compressing action. At the rear of said flange 27 is disposed a heavy spring comprising an outer, heavy coil 31 and an inner lighter coil 32.

Upon buffing movement, pressure from the draw bar will be transmitted from the wedge 23 and from the latter through the friction shoes to the shell and on account of the relation of the friction shoes, wedge and spring 30, the degree of friction will remain constant during the entire inward movement of said elements as a unit. In addition to the frictional resistance thus obtained, there is the added straight spring resistance of the heavy springs 31 and 32. In Fig. 2 is illustrated the position of the parts under full compression. When the pressure is removed, the parts will be released by the heavy spring acting through the wedge to disengage the latter from its tight frictional contact with the shoes, should the latter stick at first. This disengaging movement of the wedge relatively to the shoes is permissible on account of the remaining permissible compression of the light spring 30. The wedging elements being thus released by the heavy spring will all be returned to full release or normal position and the gear then in condition to receive another blow.

In the construction illustrated in Fig. 6, the arrangement is substantially the same as that illustrated in the other figures except that the wedge 123 is provided with a short rearward extension 126 that is socketed within a boss 50 formed on the forward side of a follower 127. In other words, instead of forming the flange at the rear of the wedge integral with the latter, as illustrated in Figs. 1, 2 and 4, the flange or follower is made separable in order to facilitate assembling of the parts. The operation will be the same as for that above described, it being understood that the capacity of the springs at the rear of the follower 127 will be great enough to overcome the light spring interposed between the said follower and the friction shoes and always maintain the wedge and said follower 127 in tight engagement with each other.

I claim:

1. In a friction gear, the combination with a friction shell, of friction shoes cooperable therewith, a wedge co-acting with said shoes, means for maintaining a predetermined and substantially constant degree of friction between said shoes and shell, and a release spring.

2. In a friction gear, the combination with a friction shell, of friction shoes, wedge, and spring assembled to move as a unit and with a substantially fixed non-varying wedge relation between the shoes, wedge and spring during actuation of the gear; and a spring acting to resist movement of said unit and to effect the release action.

3. In a friction gear, the combination with a friction shell, of friction shoes, wedge, and spring assembled to move as a unit and with a substantially fixed relation relatively to said shell during actuation of the gear, and a spring acting to resist said movement and to effect the release action, said last named spring exerting pressure directly against said wedge.

4. In a friction gear, the combination with a friction shell, of a series of friction shoes cooperable with said shell, a wedge mounted within said shoes, a light spring interposed between and re-acting against both said wedge and said shoes, and a heavy spring re-acting against said shell at one end and against said wedge at the other end.

5. In a friction gear, the combination with a friction shell having a spring casing formed rigidly therewith, of a series of friction shoes cooperable with said shell, a wedge coacting with said shoes and having an inward extension with a flange at its inner end, a light spring extending between said flange and the friction shoes and reacting against both, and a heavy spring within the casing engaging the casing at one end and said flange at the other end.

6. In a friction gear, the combination with a friction shell, of a plurality of friction shoes cooperable with said shell, a wedge coacting with said shoes and having an integral inward extension with a flange at its inner end, a relatively light spring normally almost fully compressed, extending between said flange and said shoes, and a heavy release spring engaging said flange.

7. In a friction shock absorbing mechanism, the combination with a friction shell; of a friction piston cooperable with said shell, said piston comprising outer friction shoes engaging the shell, shoe-expanding means, and a spring reacting against said means and shoes to maintain a relatively fixed relation therebetween; and a main spring for resisting relative movement between said piston and shell, the resistance of the main spring and frictional resistance of the piston and shell being employed additively.

8. In a friction shock absorbing mechanism, the combination with a combined friction shell and spring casing; of means movable relatively to said shell and coacting therewith to produce a substantially uniform frictional resistance during the entire compressive movement; and a spring within said casing acting in tandem with said means.

9. In a friction shock absorbing mechanism, the combination with a substantially constant frictional resistance and a spring resistance arranged to act in tandem, said spring resistance being arranged to effect release of the friction resistance.

In witness that I claim the foregoing I have hereunto subscribed my name this 29th day of Dec. 1916.

GEORGE A. JOHNSON.